US008892266B2

(12) United States Patent
Rossi et al.

(10) Patent No.: US 8,892,266 B2
(45) Date of Patent: Nov. 18, 2014

(54) ACTIVE MONITORING AND CONTROLLING OF HOME LOADS

(75) Inventors: Sergio Rossi, Genoa (IT); Kurt Marquardt, Munich (DE); Sandro Cerato, Taufkirchen (DE)

(73) Assignee: Infineon Technologies Austria AG, Villach (AT)

( * ) Notice: Subject to any disclaimer, the term of this patent is extended or adjusted under 35 U.S.C. 154(b) by 380 days.

(21) Appl. No.: 13/249,526

(22) Filed: Sep. 30, 2011

(65) Prior Publication Data

US 2013/0085622 A1    Apr. 4, 2013

(51) Int. Cl.
| | | |
|---|---|---|
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *H02J 3/14* | (2006.01) | |
| *H02J 13/00* | (2006.01) | |

(52) U.S. Cl.
CPC ...... *H02J 3/14* (2013.01); *Y04S 20/242* (2013.01); *Y02B 70/3266* (2013.01); *H02J 2003/143* (2013.01); *H02J 13/0013* (2013.01)
USPC .......................................... 700/291; 700/295

(58) Field of Classification Search
USPC ................................................. 700/291, 295
See application file for complete search history.

(56) References Cited

U.S. PATENT DOCUMENTS

| | | | | |
|---|---|---|---|---|
| 4,349,879 | A * | 9/1982 | Peddie et al. ................ | 700/295 |
| 5,576,700 | A * | 11/1996 | Davis et al. ................. | 340/3.31 |
| 7,844,370 | B2 * | 11/2010 | Pollack et al. ............... | 700/291 |
| 7,949,435 | B2 * | 5/2011 | Pollack et al. ............... | 700/291 |
| 8,165,724 | B2 * | 4/2012 | Kerofsky ...................... | 700/291 |
| 8,170,695 | B2 * | 5/2012 | Spicer et al. .................. | 700/22 |
| 8,265,776 | B2 * | 9/2012 | Osann, Jr. ..................... | 700/22 |
| 8,386,086 | B2 * | 2/2013 | Roux et al. .................... | 700/291 |
| 8,487,474 | B2 * | 7/2013 | Weidman et al. .............. | 307/38 |
| 8,649,883 | B2 * | 2/2014 | Lu et al. ......................... | 700/22 |
| 2003/0050737 | A1 * | 3/2003 | Osann, Jr. ..................... | 700/276 |
| 2006/0049694 | A1 * | 3/2006 | Kates ....................... | 307/132 E |
| 2008/0039979 | A1 * | 2/2008 | Bridges et al. ............... | 700/292 |
| 2010/0094470 | A1 * | 4/2010 | Besore et al. ................ | 700/282 |
| 2011/0071694 | A1 * | 3/2011 | Mammone .................... | 700/291 |
| 2011/0082599 | A1 * | 4/2011 | Shinde et al. ................. | 700/295 |
| 2011/0230982 | A1 * | 9/2011 | Lee ................................ | 700/83 |
| 2011/0270453 | A1 * | 11/2011 | Kalogridis et al. .......... | 700/291 |
| 2012/0171955 | A1 * | 7/2012 | Drake et al. .................. | 455/41.2 |
| 2013/0085622 | A1 * | 4/2013 | Rossi et al. ................... | 700/295 |
| 2013/0096723 | A1 * | 4/2013 | Ludwig ......................... | 700/276 |
| 2013/0151024 | A1 * | 6/2013 | Bae et al. ...................... | 700/295 |

FOREIGN PATENT DOCUMENTS

CN            1372713 A        10/2002

* cited by examiner

*Primary Examiner* — Ronald Hartman, Jr.
(74) *Attorney, Agent, or Firm* — Slater & Matsil, L.L.P.

(57) ABSTRACT

A load control arrangement includes a communication channel configured to transmit information. A controller unit is coupled to the communication channel and configured to at least one of send and receive information via the communication channel. A load control device is coupled to the communication channel, comprising a disconnect switch configured to be coupled to a power line. The load control device is further configured to determine a power consumption of a load connected to the power line. The load control device provides measurement data representing the determined power consumption via the communication channel to the controller unit. The load control device drives the disconnect switch depending on drive information received via the communication channel or depending on the determined power consumption.

22 Claims, 4 Drawing Sheets

ACTIVE MONITORING AND CONTROLLING OF HOME LOADS

TECHNICAL FIELD

The present disclosure relates to a load control arrangement, in particular a load control arrangement for monitoring and controlling home loads.

BACKGROUND

Automatic meter reading (AMR) has been introduced by utility providers, such as energy or gas providers, for example, in order to be able to automatically collect consumption, diagnostic and status data from energy or water metering devices. This data is transferred to a central database for billing, troubleshooting and analyzing. This makes information about consumption available almost real-time. This timely information coupled with analysis may help both utility providers and consumers to better control the use and production of electric energy, gas usage or water consumption.

Originally, AMR devices just collected meter readings electronically and matched them with accounts. As technology has advanced, additional data may now be captured, stored, and transmitted to the main computer located at the utility providers, and often the metering devices can be controlled remotely. Many AMR devices can also capture interval data, and log meter events.

The logged data can be used to collect or control time of use or rate of use data that can be used for water or energy usage profiling, demand forecasting, demand response, flow monitoring, water and energy conservation enforcement, remote shutoff, and many more.

Advanced Metering Infrastructure (AMI) is the new term introduced to represent the two way communication technology of fixed network meter systems characterized by demand-response application. The meters in an AMI system are often referred to as smart meters, since they often can use collected data based on programmed logic.

A smart meter is usually an electronic device which is coupled to the power line and which is adapted to measure the power consumption and to store measurement data representing the power consumption in a memory device. Instead of a power line, smart meters might also be coupled to gas, water or heating lines, for example, and measure and store a respective consumption. The memory can be read out on-site. Alternatively, the smart meter may have an interface which connects the smart meter to a communication network. Via the network the utility provider can read out the memory so that there is no need to have an employee on-site. Some smart meters include a switching arrangement which can be remotely operated by the utility provider in order to interrupt or limit the power supply when, for example, the customer is consuming an excess of power.

Smart meters are also a tool to help consumers better manage their energy, gas water or heating use. Smart meters connected to a display can provide up to date information on flow (gas, water, heat) and electricity consumption and the associated price information in the currency of that country and in doing so may help people to better manage their energy use and to reduce their energy bills and carbon emissions.

As the smart meters are just gateways between homes and utilities, and home loads can only be controlled jointly via the network, the advanced meter infrastructure enables distributed control of the homes major loads.

There is, therefore, a need for an arrangement, to actively monitor and control individual home loads.

SUMMARY OF THE INVENTION

A load control arrangement is disclosed. In accordance with one example of the present invention the circuit arrangement includes a communication channel configured to transmit information. A controller unit is coupled to the communication channel and configured to at least one of send and receive information via the communication channel. A load control device is coupled to the communication channel, comprising a disconnect switch configured to be coupled to a power line. The load control device is further configured to determine a power consumption of a load connected to the power line, to provide measurement data representing the determined power consumption via the communication channel to the controller unit and to drive the disconnect switch depending on drive information received via the communication channel or depending on the determined power consumption.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

In the following description, reference is made to the accompanying drawings, which form a part thereof, and in which is shown by way of illustration specific embodiments in which the invention may be practiced. In this regard, directional terminology, such as "top", "bottom", "front", "back", "leading", "trailing" etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
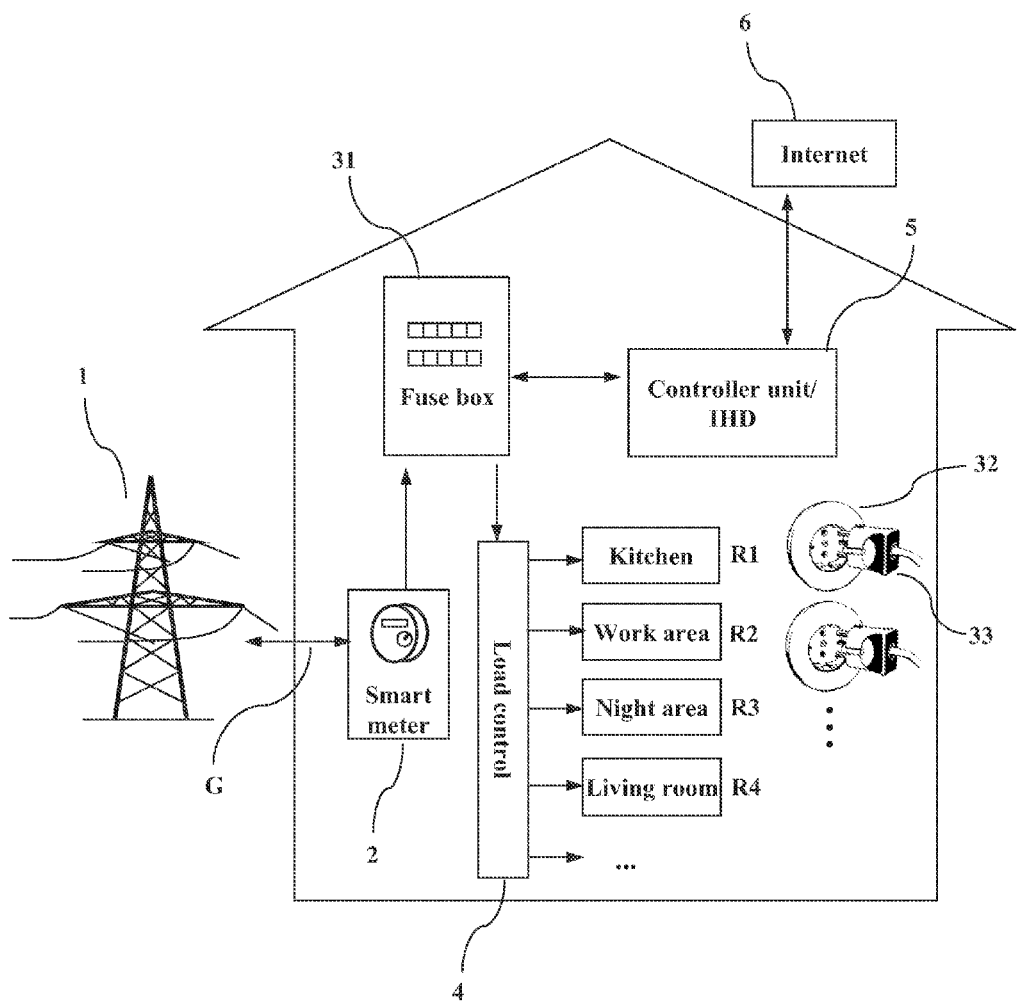
FIG. 1 illustrates an embodiment of a load control arrangement installed in a building, which includes components for load control and internal and external communication.

FIG. 1 shows a first embodiment of a load control arrangement installed in a building. This describes only one possible embodiment of the present invention. Load control arrangements according to this invention might also be installed only in parts of a building like in apartments, for example. The load control arrangement includes a smart meter 2 coupled to a power line, the power line being connected to the power grid G. The smart meter 2 is adapted to measure the power consumption in the building and to store a measurement value representing this power consumption. The smart meter can also be adapted to control the power consumption in the building. Via the power grid G the utility provider, such as an energy provider 1, is in signal communication with the smart meter 2 to, for example, read out the stored measurement data.

A fuse box 31 is coupled to the smart meter. The fuse box 31 can be a conventional fuse box as employed in almost every building today, in order to distribute electricity within the building and for protection, e.g., over current protection. A controller unit 5, also referred to as in-home controller or in-home display (IHD), and a load control device 4 are coupled to the fuse box 31. The controller unit or in-home display 5 could be a simple wall mounted display up to a battery operated device with, for example, a TFT display and/or a touchscreen. Advanced IHDs 5 do not only display consumption information, but are also configured to communicate power consumption advice from the energy provider to the user. The controller unit 5 may be connected, directly or indirectly, to the internet 6, such that a user can connect to the controller unit 5, read out or analyze data or program the controller unit 5 without actually being at home.

The load control device 4 can be directly coupled to the fuse box 31 and may have an output for every room in the building. The load control device 4 is configured to supply the rooms or areas within a building with electrical power. In this case, the load control device 4 is configured to control each room in the building separately. For example, if computers or other electronic equipment in a work area R2 are not needed during the night, the load control device 4 may temporarily disconnect the work area R2 with all its loads from the power line. By disconnecting the loads from the power line and therefore switching them off instead of having them running in a standby mode, power consumption can be reduced. Via the controller unit 5 or any other suitable input device a user can, for example, program periods in which electronic equipment in certain rooms or areas of the building are not needed. A night area R3 which includes, for example, the sleeping rooms might be disconnected during the day, or a living room R4 may be disconnected late at night.

Instead of coupling one load control device 4 directly to the fuse box 31 and controlling groups of loads within one room, it is also possible to insert one load control device 4 in every socket 32 or plug 33 in a building. By having a load control device 4 inserted in each socket 32, for example, it is possible to control each single load individually.

Figure 2:
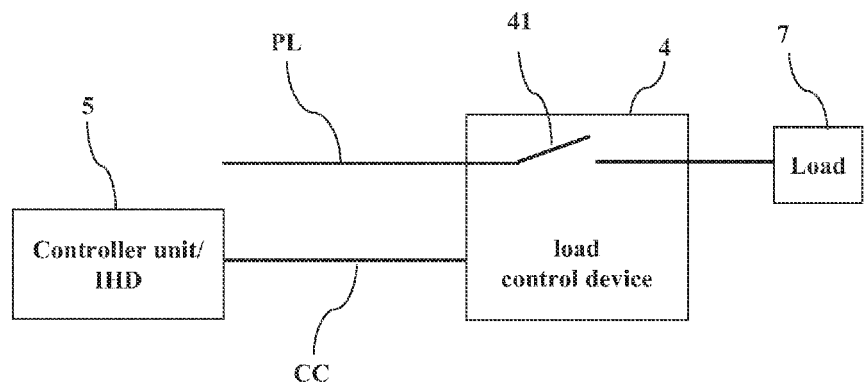
FIG. 2 illustrates an embodiment of a load control arrangement which includes a controller unit, a load control device and a load.

Referring to FIG. 2, a load control device 4 is coupled to the power line PL which supplies a load 7. The load 7 may include an individual load or may include a plurality of loads, such as all the loads in a room or an area of the building. The load control device 4 further includes a switch, such as a disconnect switch 41. The disconnect switch 41 may be an electronic switch, implemented as a relay or a semiconductor switch, such as a power transistor. By opening or closing this disconnect switch 41, the load control device 4 can connect or disconnect the load 7 to the power line PL. The load control device 4 is also connected to a communication channel CC. Via this communication channel CC the load control device 4 is in signal communication with the controller unit 5, so as to be able to receive and send data, such as, for example, data from and to the controller unit 5. Based on information received from the controller unit 5 via the communication channel CC, the load control device 4 can either open or close the disconnect switch 41 in order to disconnect the load 7 from the power line PL or to connect the load 7 to the power line PL.

In addition to the controller unit 5, any other suitable input, data storing and processing devices may be connected to the communication channel CC. The load control device 4 may then be in signal communication with one or more of the other devices connected to the communication channel CC, so as to be able to receive from and send data to the respective devices.

Figure 3:
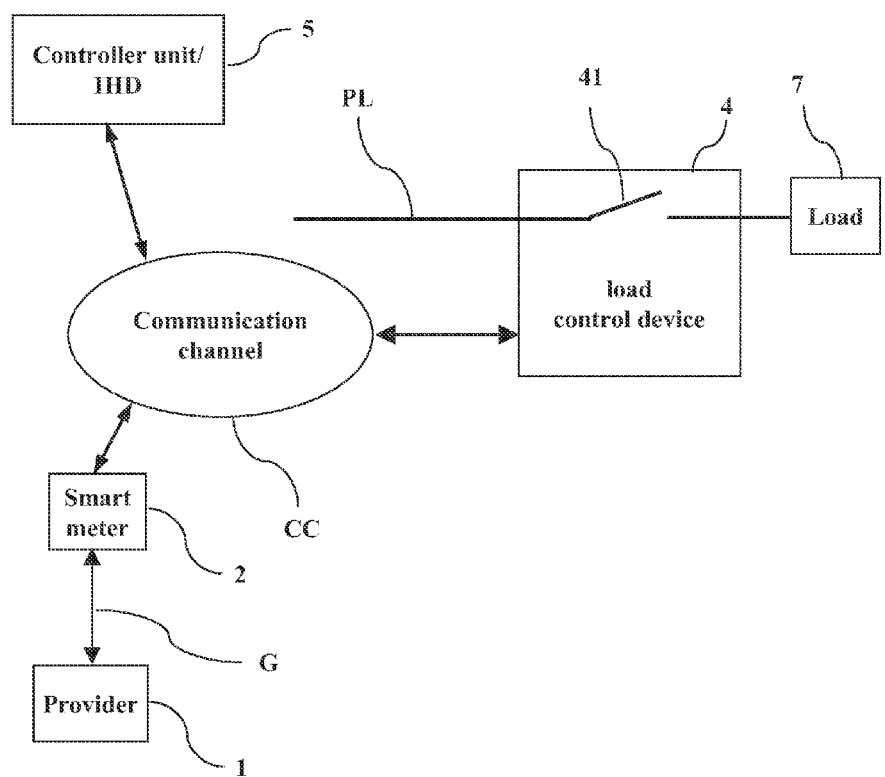
FIG. 3 illustrates an embodiment of a load control arrangement which includes a communication channel for internal and external communication.

FIG. 3 shows a further embodiment of a load control arrangement. In this embodiment, the load control device 4 with the disconnect switch 41 is coupled to a communication channel CC to which also the controller unit 5, as well as the smart meter 2 are connected to. The load control device 4 may therefore send to or receive data from both the controller unit 5 and the smart meter 2. The smart meter 2 and the controller unit 5 can also communicate with each other over the communication channel CC. The smart meter 2 can be connected to the energy provider 1 via the power grid G or via any other communication channel. Therefore, information originating from the energy provider 1 can be received by the smart meter 2 and the smart meter 2 can then provide this information over the communication channel CC to the other devices. This information may include current rates at certain times of day and night or times at which the power grid is heavily or lightly loaded.

The controller unit 5 is configured to process and analyze this information and to trigger actions based on those results. If, for example, the controller unit 5 receives the information that current rates are high at one moment in which a certain device, such as the television, is not needed, it can send appropriate information to the load 7 control device 4 controlling the respective load, in order to disconnect the load from the power line PL. Again, a load may be an individual load or a plurality of loads arranged in a certain room or area of the building. In the first case, the load control device 4, is coupled to the power line PL of the individual device, such as, for example, in a plug of the device or in a socket. In the second case, the load control device 4 is coupled to the main power line of the room or area, this main power line is, for example, accessible in the fuse box.

Figure 4:
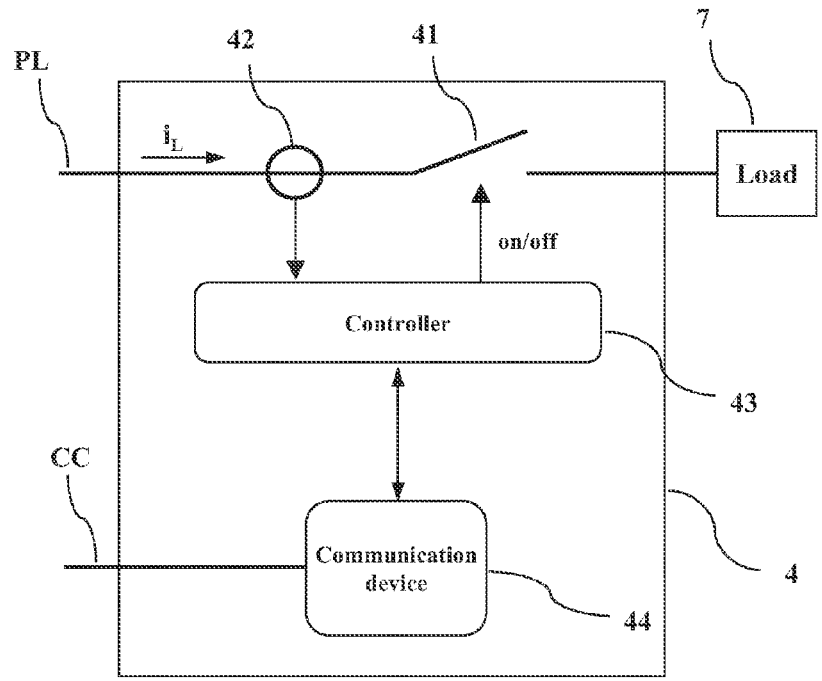
FIG. 4 illustrates an embodiment of a load control device which is coupled to a power line and a communication channel.

One possibility for gaining information about whether a certain load 7 is needed at a certain time is to program the controller unit 5 manually. The user can do the programming directly via the display or, e.g., via the internet 6. Another possibility is to constantly measure the power consumption of each load 7. For this, the load control device 4 may include a metrology unit 42 as shown in FIG. 4. This metrology unit 42 is coupled to the power line PL in order to determine the power consumption of the load 7. The load control device 4 shown in FIG. 4 also includes a controller 43, which is coupled to the metrology unit 42 and is configured to receive the measurement data representing the power consumption of the load 7. The controller 43 then provides this data to a communication interface or device 44 which is coupled to the communication channel CC. The communication device 44 is configured to send data received from the controller 43 to other components coupled to the communication channel CC, such as, for example, the controller unit 5. The controller 43 is further configured to drive the disconnect switch 41 in either an off-state (load off) or an on-state (load on).

Figure 5:
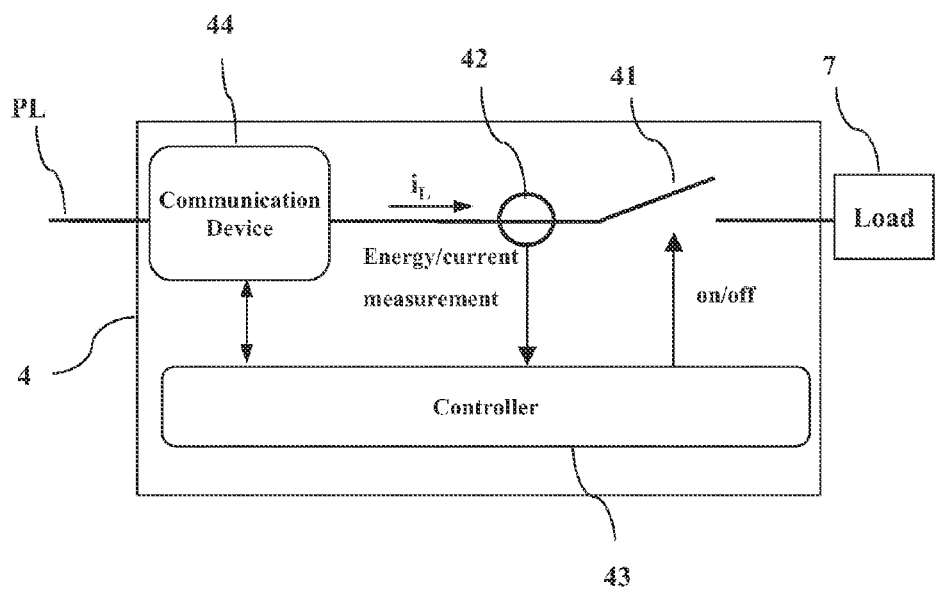
FIG. 5 illustrates an embodiment of a load control device in which the power line is used as communication channel.

The communication channel CC can be any suitable wired or wireless channel. It is also possible that the power line PL itself functions as a communication channel CC as shown in FIG. 5. In this case, the communication device 44 is coupled to the power line PL. The communication device 44 might in this case be a power line communication modem or any other suitable device which is able to communicate via the power line PL.

In the embodiments illustrated in FIGS. 4 and 5, measurement data determined by the metrology unit 42 is provided to the controller 43 coupled to the communication device 44. The communication device 44 sends information over or receives information via the communication channel CC (which corresponds to the power line PL in the embodiment of FIG. 5). Based on information received via the communication channel and on measurement data representing the power consumption of the load 7, the controller is configured to switch on or off the disconnect switch 41 in order to connect or disconnect the load 7.

Figure 6:
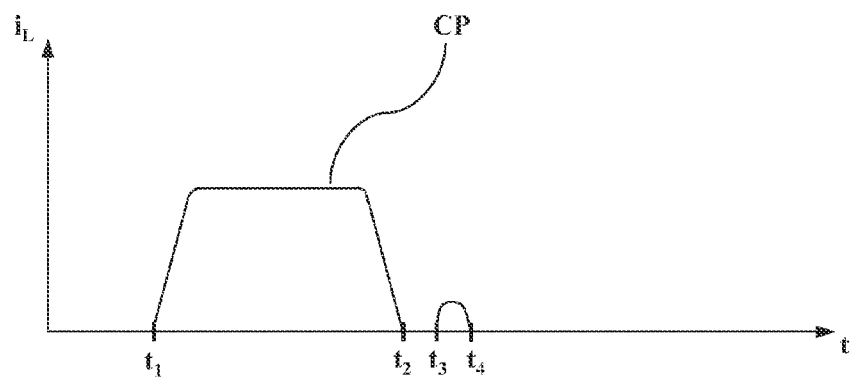
FIG. 6 illustrates a power consumption profile of a home load.

FIG. 6 shows an example of a power consumption or current profile of a load 7. The load 7 might be a dishwasher, for example. For explanation purposes it is assumed that the load 7 is switched on at time $t_1$ so that the load current $i_L$ rises and stays at a high level while the load is running. A time period between the first time $t_1$ and a later time $t_2$ represents the cleaning process CP. The cleaning process is finished at time $t_2$. Between time instants $t_2$ and $t_3$ there is a drying and cooling phase, in which the load current $i_L$ of the dishwasher is zero. Between $t_3$ and $t_4$ the load current $i_L$ rises again to a low level as the dishwasher pumps down remaining water.

Many home appliances, like dishwashers, washing machines or clothes dryers have typical current profiles. Such current profiles may be loaded and stored into the load control device 4 or possibly also into the controller unit 5. By constantly monitoring the current consumption of the loads with the load control device 4, it is possible to compare the stored current profiles with the actual current consumption. In this way, the load control device 4 is able to detect if a load 7 is being used and can decide which loads 7 might be switched off in order to reduce current consumption at a certain time.

During periods of heavy load within the power grid G some loads might be switched off even if in use. The controller unit 5 knows which loads can be disconnected for a shorter or longer period even if currently in use. In case a load control device 4 is not installed within each socket 32 or plug 33 in a building, but in the fuse box 31, only groups of loads 7 can be controlled.

It is also possible to not completely switch off a load, but to limit its load current $i_L$ to a certain level. Via the controller unit 5, the internet 6 or any other suitable input device the user could then implement appropriate programming, in order to know for which loads 7 the load current $i_L$ may be limited at certain time periods. For some loads 7 in a building it will not be possible to limit the load current $i_L$. Measurement data gained by the load control device 4 might also be used in order to decide which load currents $i_L$ might be limited or not.

Figure 7:
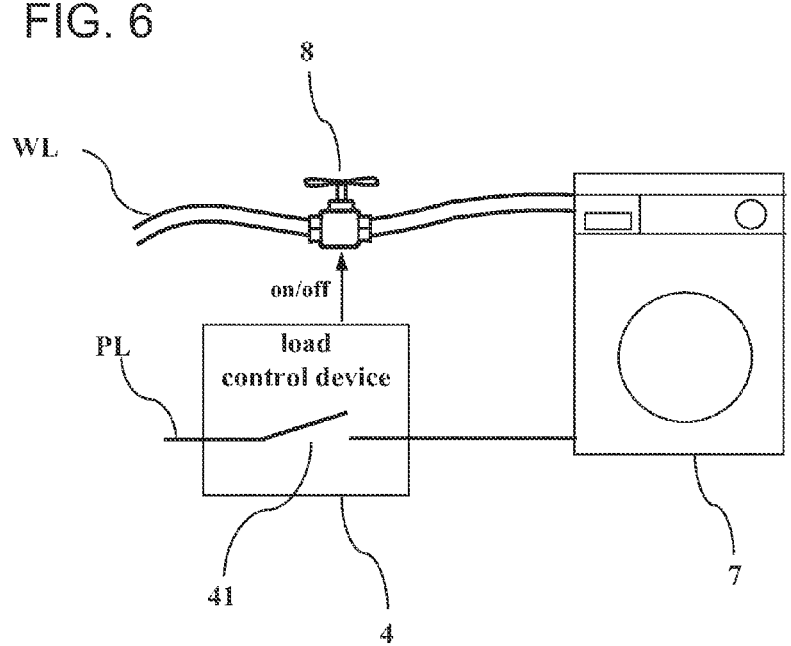
FIG. 7 illustrates one embodiment of a load control arrangement which is able to control the flow in a water line.

The load control device 4 might also be coupled to gas or water lines WL, for example. The load control device 4 might then control the gas or water flow in the gas or water lines WL. FIG. 7 shows a load 7 which in this case is a washing machine. The load control device 4 is coupled to the power line PL of the washing machine 7. By switching on or off the disconnect switch 41, it can connect or disconnect the washing machine 7 from the power line PL. A valve 8 is connected to the water line WL of the washing machine 7. This valve 8 can also be controlled by the load control device 4. Water flow can be allowed by opening the valve 8 or stopped by closing the valve 8. The water supply of the washing machine 7 can be stopped based on the same information as used to open or close the disconnect switch 41. Switching off gas or water lines WL when home appliances are not in use increases the security in a building by reducing the possibility of gas or water lines WL leaking.

Spatially relative terms such as "under", "below", "lower", "over", "upper" and the like are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc., and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A load control arrangement for a structure comprising a plurality of electrical sub-loads, the load control arrangement comprising:
   a controller unit configured to be coupled to a communication channel and configured to:
      send or receive information via the communication channel,
      display information to a user on a display, and
      be programmed to include a load current limit, wherein the programming is received at the display from a user; and
   a load control device configured to be coupled to the communication channel, comprising a disconnect switch configured to be coupled to a power line between a fuse box and an electrical sub-load of the plurality of electrical sub-loads, wherein the load control device is further configured to:
      determine a power consumption of the electrical sub-load connected to the power line,
      provide measurement data representing the determined power consumption via the communication channel to the controller unit, and
      drive the disconnect switch depending on drive information received via the communication channel or depending on the determined power consumption.

2. The load control arrangement according to claim 1, wherein the communication channel comprises a wireless communication channel.

3. The load control arrangement according to claim 1, wherein the communication channel includes a power line.

4. The load control arrangement according to claim 1, wherein the load control device is located in one of the fuse box, a socket or a plug.

5. The load control arrangement according to claim 1, wherein the load control device further comprises a metrology unit, a controller and a communication device.

6. The load control arrangement according to claim 1, further comprising a smart meter coupled to the communication channel and configured to receive data from an energy provider via a power grid and to send this data to the controller unit or the load control device via the communication channel.

7. The load control arrangement according to claim 6, wherein the load control device is further configured to provide the measurement data representing the determined power consumption via the communication channel to the smart meter.

8. The load control arrangement according to claim 1, wherein the controller unit is configured to generate results by processing the information and the measurement data received via the communication channel and trigger actions within the load control arrangement based on the results.

9. The load control arrangement according to claim 1, wherein the load control device is configured to determine a load current flowing to the sub-load, and to provide measurement data representing the load current to the communication channel.

10. The load control arrangement according to claim 9, wherein the load control device is configured to have a power consumption profile of the sub-load stored therein.

11. The load control arrangement of claim 10, wherein the controller unit is configured to generate drive information for the load control device dependent on the power consumption profile of the sub-load and dependent on the measurement data representing the determined power consumption of the sub-load.

12. The load control arrangement according to claim 1, wherein the load control device is further configured to limit a load current flowing to the sub-load depending at least on the programmed load current limit in the controller unit and the measurement data received via the communication channel.

13. The load control arrangement according to claim 1, wherein the disconnect switch is a relay or a semiconductor switch.

14. The load control arrangement according to claim 1, wherein the programming is received at the display from the user over an internet connection.

15. The load control arrangement according to claim 1, wherein the programming is received manually at the display from the user.

16. The load control arrangement according to claim 1, wherein the display is an in-home display.

17. The load control arrangement according to claim 1, wherein the display is located proximally to the electrical sub-load and distally from an energy provider.

18. A load control arrangement for a structure comprising a plurality of electrical sub-loads, the load control arrangement comprising:
a controller unit configured to be coupled to a communication channel and configured to send or receive information via the communication channel and display information to a user within the structure; and
a load control device configured to be coupled to the communication channel, comprising a disconnect switch configured to be coupled to a power line between a fuse box and an electrical sub-load of the plurality of electrical sub-loads, wherein the load control device is further configured to:
determine a power consumption of the electrical sub-load connected to the power line,
provide measurement data representing the determined power consumption via the communication channel to the controller unit,
drive the disconnect switch depending on drive information received via the communication channel or depending on the determined power consumption, and
be connected to a gas or water line and to shut down water or gas flow in the gas or water line, when the disconnect switch is switched off.

19. A power management system comprising:
an in-home display configured to be connected to a smart meter and an internet connection;
a load control device coupled to the in-home display and coupled between a plurality of in-home loads and a fuse box, wherein the load control device comprises a metrology unit and disconnect switch coupled to each load of the plurality of in-home loads; and
wherein:
either the in-home display or the load control device is configured to store a power consumption profile for each respective load of the plurality of in-home loads,
the in-home display is configured to be programmed by a user at the in-home display, and
the load control device is configured to switch off the disconnect switch coupled to a respective load of the plurality of in-home loads based on the programming by the user, the stored power consumption profile for the respective load, and measurements from the metrology unit coupled to the respective load.

20. The power management system of claim 19, wherein the in-home display if further configured to be programmed over the internet connection.

21. The power management system of claim 19, wherein the load control device further comprises a plurality of controllers, wherein each controller is coupled to a metrology unit and a disconnect switch for each load of the plurality of in-home loads.

22. The power management system of claim 19, wherein the controller is configured to store the power consumption profile for each respective load of the plurality of in-home loads.

* * * * *